US011893914B2

(12) United States Patent
Bai

(10) Patent No.: US 11,893,914 B2
(45) Date of Patent: Feb. 6, 2024

(54) TEST CIRCUIT AND METHOD FOR DISPLAY PANEL AND DISPLAY PANEL

(71) Applicant: Yungu (Gu' an) Technology Co., Ltd., Hebei (CN)

(72) Inventor: Guoxiao Bai, Langfang (CN)

(73) Assignee: Yungu (Gu' an) Technology Co., Ltd., Langfang (CN)

( * ) Notice: Subject to any disclaimer, the term of this patent is extended or adjusted under 35 U.S.C. 154(b) by 0 days.

(21) Appl. No.: 17/591,213

(22) Filed: Feb. 2, 2022

(65) Prior Publication Data

US 2022/0157213 A1 May 19, 2022

Related U.S. Application Data

(63) Continuation of application No. PCT/CN2020/126236, filed on Nov. 3, 2020.

(30) Foreign Application Priority Data

Jan. 20, 2020 (CN) ........................ 202010067307.9

(51) Int. Cl.
*G09G 3/00* (2006.01)

(52) U.S. Cl.
CPC ......... *G09G 3/006* (2013.01); *G09G 2310/08* (2013.01); *G09G 2330/12* (2013.01)

(58) Field of Classification Search
CPC ............... G09G 3/006; G09G 2310/08; G09G 2330/12; G01R 19/165
See application file for complete search history.

(56) References Cited

U.S. PATENT DOCUMENTS 5,057,775 A * 10/1991 Hall ....................... G09G 3/006
324/73.1
5,774,100 A * 6/1998 Aoki .................... G09G 3/3648
345/87

(Continued)

FOREIGN PATENT DOCUMENTS

CN 102109688 A 6/2011
CN 103698915 A 4/2014

(Continued)

OTHER PUBLICATIONS

International Search Report (with English Translation) and Written Opinion dated Jan. 27, 2021 in corresponding International Application No. PCT/CN2020/126236, 13 pages.

(Continued)

*Primary Examiner* — Jose R Soto Lopez
(74) *Attorney, Agent, or Firm* — Maier & Maier, PLLC

(57) ABSTRACT

A test circuit and method for a display panel, and a display panel. The test circuit includes a panel test sub-circuit configured to control panel test switch units to turn on or turn off, to transmit multiple panel test signals; an array test sub-circuit configured to control array test switch units to turn on or turn off, to output short circuit determination signals at test terminals according to the multiple panel test signals, which are used to determine whether there is a short-circuited data line in the display panel; at least one set of the array test switch units are turned on in a test sub-period, and under a condition that the at least one set of the array test switch units are turned on, the panel test signals corresponding to different types of sub-pixels in the display panel change alternately to an effective level.

17 Claims, 7 Drawing Sheets

(56) References Cited

U.S. PATENT DOCUMENTS

| | | | | |
|---|---|---|---|---|
| 6,028,442 | A * | 2/2000 | Lee | G09G 3/006 324/760.02 |
| 6,265,889 | B1 * | 7/2001 | Tomita | G09G 3/006 324/760.02 |
| 9,576,515 | B2 * | 2/2017 | Tsou | G09G 3/2003 |
| 10,636,339 | B2 * | 4/2020 | Kim | H01L 27/0296 |
| 10,930,216 | B2 * | 2/2021 | Yi | G09G 3/3275 |
| 11,011,085 | B2 * | 5/2021 | Lee | H10K 59/88 |
| 11,043,540 | B2 * | 6/2021 | Zheng | G09G 3/006 |
| 11,145,231 | B2 * | 10/2021 | Lin | G09G 3/006 |
| 11,238,765 | B2 * | 2/2022 | Park | G09G 3/2003 |
| 11,270,610 | B2 * | 3/2022 | Shim | G09G 3/006 |
| 11,276,339 | B2 * | 3/2022 | Kim | G09G 3/3291 |
| 2002/0140650 | A1 * | 10/2002 | Kai | G09G 3/3688 345/87 |
| 2005/0168491 | A1 * | 8/2005 | Takahara | H10K 50/85 345/690 |
| 2006/0125510 | A1 * | 6/2006 | Brunner | G09G 3/006 324/754.22 |
| 2008/0007504 | A1 * | 1/2008 | Kawaura | G09G 3/006 345/904 |
| 2009/0262048 | A1 * | 10/2009 | Park | G09G 3/30 345/76 |
| 2010/0259527 | A1 * | 10/2010 | Odawara | G09G 3/3233 345/76 |
| 2011/0199400 | A1 * | 8/2011 | Ikeda | G09G 3/3696 345/690 |
| 2011/0221719 | A1 * | 9/2011 | Kim | G09G 3/3648 345/204 |
| 2011/0279746 | A1 * | 11/2011 | Kim | G09G 3/006 324/760.02 |
| 2012/0326744 | A1 * | 12/2012 | Tajika | G01R 31/26 438/34 |
| 2013/0141314 | A1 | 6/2013 | Ka et al. | |
| 2013/0188104 | A1 * | 7/2013 | Aoki | G02F 1/134336 349/12 |
| 2014/0354285 | A1 * | 12/2014 | Kim | G09G 3/006 324/414 |
| 2014/0354286 | A1 * | 12/2014 | Kim | G09G 3/006 324/414 |
| 2015/0241501 | A1 * | 8/2015 | Jang | G09G 3/006 324/527 |
| 2015/0325159 | A1 * | 11/2015 | Li | G09G 3/006 438/151 |
| 2016/0104402 | A1 * | 4/2016 | Kim | G09G 3/006 324/762.07 |
| 2016/0260367 | A1 * | 9/2016 | Kwak | G09G 3/3291 |
| 2017/0256188 | A1 * | 9/2017 | Chang | G09G 3/006 |
| 2018/0076102 | A1 * | 3/2018 | Ka | H01L 27/1251 |
| 2019/0279544 | A1 * | 9/2019 | Shin | G02F 1/136209 |
| 2020/0342807 | A1 * | 10/2020 | Li | G09G 3/006 |
| 2021/0090480 | A1 * | 3/2021 | Sun | G09G 3/006 |
| 2021/0225216 | A1 * | 7/2021 | Wang | G06F 3/0443 |
| 2021/0350736 | A1 * | 11/2021 | Wu | H10K 59/353 |
| 2021/0366328 | A1 * | 11/2021 | Yu | G02F 1/136286 |

FOREIGN PATENT DOCUMENTS

| | | | |
|---|---|---|---|
| CN | 104991358 | A | 10/2015 |
| CN | 104992651 | A | 10/2015 |
| CN | 105676497 | A | 6/2016 |
| CN | 105741722 | A | 7/2016 |
| CN | 206097859 | U | 4/2017 |
| CN | 107342033 | A | 11/2017 |
| CN | 104217671 | B | 12/2017 |
| CN | 108806602 | A | 11/2018 |
| CN | 109188812 | A | 1/2019 |
| CN | 109584760 | A | 4/2019 |
| CN | 105575301 | B | 5/2019 |
| CN | 110349525 | A | 10/2019 |
| CN | 111128063 | A | 5/2020 |
| JP | 2012220851 | A | 11/2012 |
| JP | 2013117709 | A | 6/2013 |
| JP | 2019133029 | A | 8/2019 |
| KR | 20090090677 | A | 8/2009 |
| KR | 1020130061480 | A | 6/2013 |
| KR | 1020140141375 | A | 12/2014 |
| KR | 1020150039491 | A | 4/2015 |

OTHER PUBLICATIONS

The First Office Action dated Jan. 6, 2021, in connection with corresponding Chinese Application No. 202010067307.9 (10 pages, including machine-generated English translation).

Extended European Search Report dated Jun. 16, 2023, in corresponding European Application No. 20915809.6, 16 pages.

Notice of Reasons for Refusal dated Apr. 18, 2023, in corresponding Japanese Application No. 2022-521688, 3 pages.

Office Action dated Sep. 5, 2023, in corresponding Korean Application No. 10-2022-7011776, 13 pages.

Office Action dated Sep. 26, 2023, in corresponding Japanese Application No. 2022521688, 7 pages.

* cited by examiner

TEST CIRCUIT AND METHOD FOR DISPLAY PANEL AND DISPLAY PANEL

CROSS-REFERENCE TO RELATED APPLICATIONS

This application is a continuation of International Application No. PCT/CN2020/126236 filed on Nov. 3, 2020, which claims the priority to Chinese patent application No. 202010067307.9 filed on Jan. 20, 2020, both of which are incorporated herein by reference in their entireties.

TECHNICAL FIELD

This application relates to the field of display technology, and particularly to a test circuit and method for a display panel, and a display panel.

BACKGROUND

With rapid development of display technology, display panels are applied more and more extensively. There are higher and higher requirements on the safety of display panels.

FIG. 1 is a schematic diagram of a display panel. As shown in FIG. 1, the display panel includes a display area and a non-display area. A plurality of traces are arranged intensively in the non-display area, including data lines. In a densely routed area, there is a high possibility of short circuiting between adjacent data lines. Once short circuit occurs between the data lines, it will affect adversely the display effect of the display panel, thereby causing a yield loss of the display panel.

SUMMARY

Embodiments of the present application provide a test circuit and method for a display panel, and a display panel.

In a first aspect, an embodiment of the present application provide a test circuit for a display panel. The test circuit includes:

a panel test sub-circuit, including a plurality of panel test switch units configured to connect to data lines of the display panel, the panel test sub-circuit being configured to control, according to a plurality of received panel test control signals, the panel test switch units to turn on or turn off, to transmit a plurality of panel test signals; and an array test sub-circuit, including a plurality of array test switch units and a plurality of test terminals, the array test switch units being configured to connect to the panel test sub-circuit and the data lines, the array test sub-circuit being configured to control, according to a plurality of received array test control signals, the array test switch units to turn on or turn off, to output short circuit determination signals at the test terminals according to the plurality of panel test signals transmitted by the panel test sub-circuit, the short circuit determination signals being used to determine whether there is a short-circuited data line in the display panel, wherein at least one set of the array test switch units are turned on in a test sub-period, and under a condition that the at least one set of the array test switch units are turned on, the panel test signals corresponding to different types of sub-pixels in the display panel change alternately to an effective level.

An embodiment of the present application provide a display panel including the test circuit for the display panel in the technical solution of the first aspect.

According to the test circuit and method for the display panel, and the display panel provided in embodiments of the present application provide, the panel test signals are transmitted to the test terminals in the array test sub-circuit, by controlling the panel test switch units in the panel test sub-circuit to turn on or turn off, and controlling the array test switch units in the array test sub-circuit to turn on or turn off, through the plurality of panel test control signals, the plurality of multiple panel test signals, and the plurality of array test control signals. Under a condition that at least one set of array test switches are turned on, the plurality of panel test signals change alternately to the effective level, to perform a short circuit test on each data line. A test on whether there is a short-circuited data line in the display panel can be implemented according only to the short-circuit determination signals outputted by the test terminals, so that relevant measures can be taken in time to avoid a yield loss of the display panel.

BRIEF DESCRIPTION OF THE DRAWINGS

The application can be better understood from the following description of the specific implementations of the present application in conjunction with the accompanying drawings, where the same or similar reference signs indicate the same or similar features.

DETAILED DESCRIPTION

Embodiments of the present application provide a test circuit and method for a display panel, and a display panel, which are applicable to a scenario where a short circuit test is performed on data lines in the display panel. For example, they can be applied to a display panel including a panel test sub-circuit adopting a demultiplexing mode (i.e., a demux mode), i.e., an AT test sub-circuit. The test circuit and method for the display panel, and the display panel in the embodiments of the present application can be used to perform a short-circuit test on data lines in the display panel, and determine whether there is a short-circuited data line in the display panel, so that a short-circuit fault of the data line can be found in advance, and relevant measures can be taken in time, to avoid a yield loss of the display panel.

Figure 1:
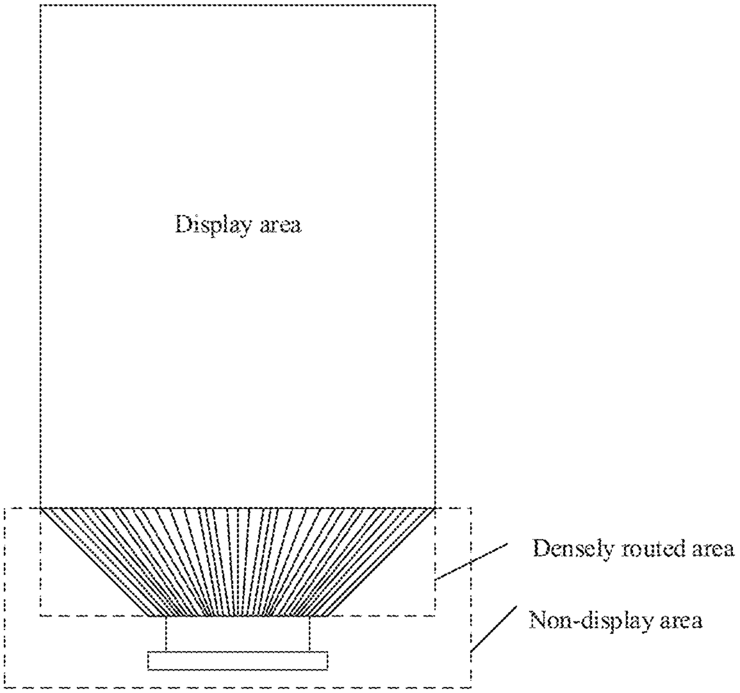
FIG. 1 is a schematic diagram of a display panel.
Figure 2:
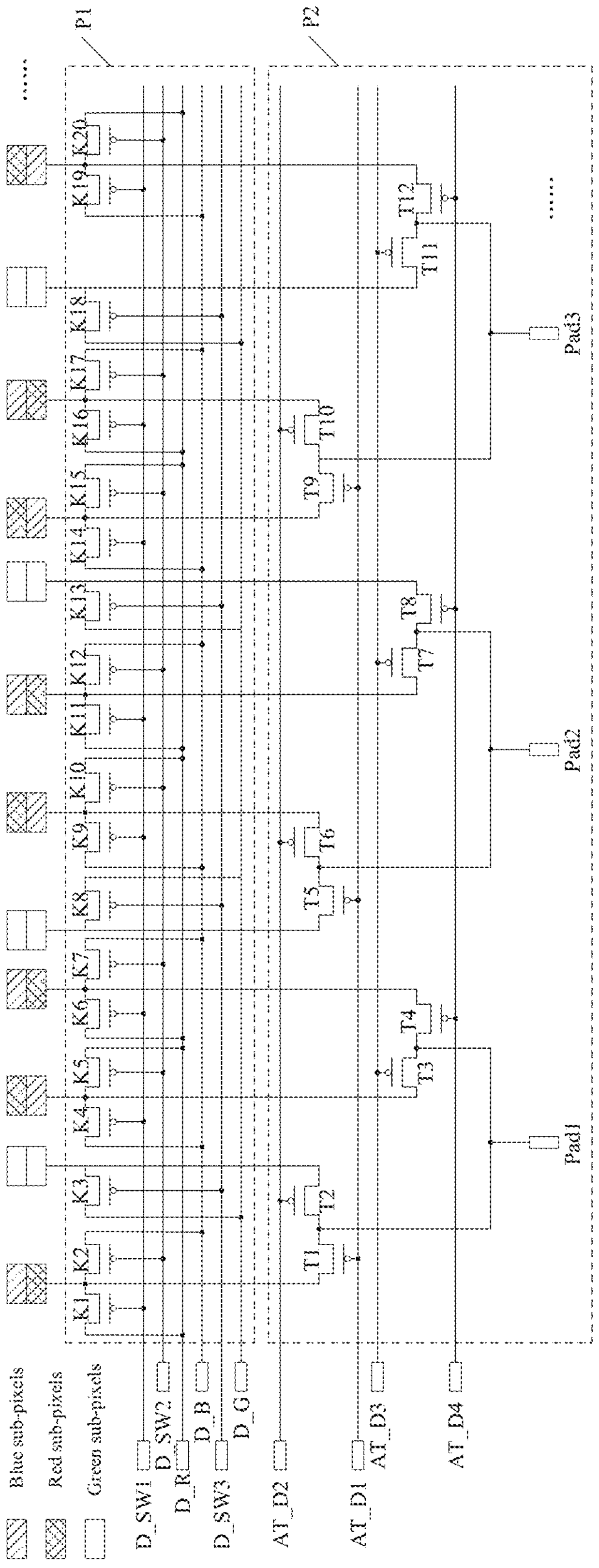
FIG. 2 is a schematic structural diagram of a test circuit for a display panel provided by an embodiment of the present application.
Figure 3:
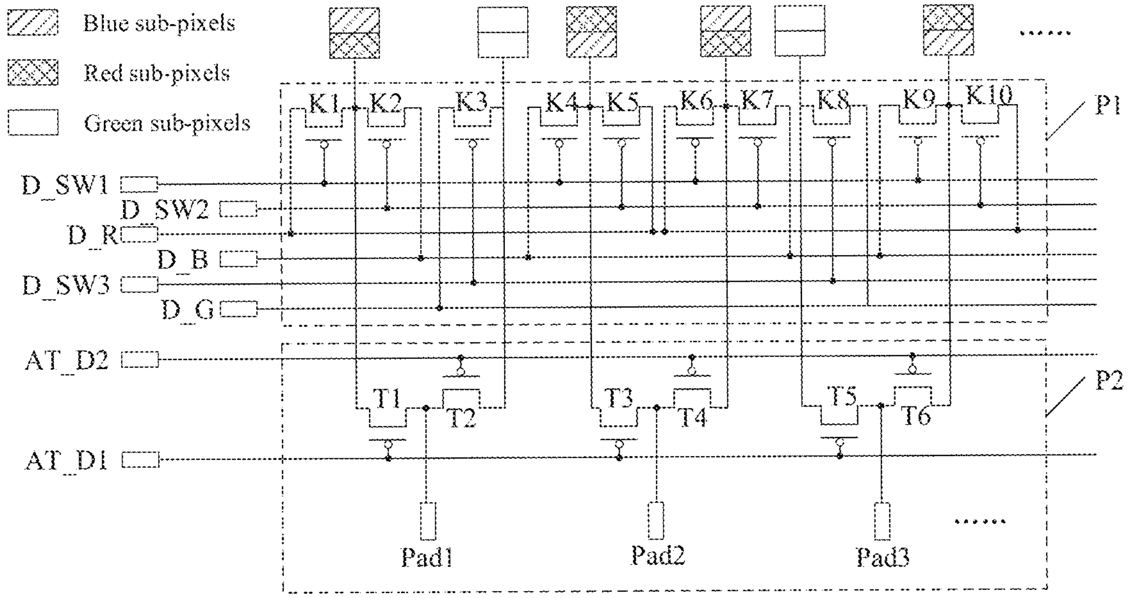
FIG. 3 is a schematic structural diagram of a test circuit for a display panel provided by another embodiment of the present application.

FIG. 2 is a schematic structural diagram of a test circuit for a display panel provided by an embodiment of the present application. FIG. 3 is a schematic structural diagram of a test circuit for a display panel provided by another embodiment of the present application. As shown in FIG. 2 and FIG. 3, a test circuit for the display panel may include a panel test sub-circuit P1, i.e., a CT test sub-circuit P1, and an array test sub-circuit P2, i.e., an AT test sub-circuit P2.

The panel test sub-circuit P1 includes a plurality of panel test switch units. The plurality of panel test switch units are configured to be connected with a plurality of data lines of the display panel. The panel test switch units may specifically be switch devices, such as thin film transistors (Thin Film Transistors, TFTs), etc., which is not limited herein. The panel test sub-circuit P1 is configured to control the panel test switch units to turn on or turn off according to the plurality of received panel test control signals, to transmit a plurality of panel test signals.

The panel test control signals may be generated by panel test control signal terminals and transmitted through panel test control signal lines. The panel test signals may be generated by panel test signal terminals and transmitted through panel test signal lines. The panel test control signals may include a plurality of panel test control signals. Correspondingly, the panel test control signal terminals may include a plurality of panel test control signal terminals, and the panel test control signal lines may include a plurality of panel test control signal lines. The panel test signals may include a plurality of panel test signals. Correspondingly, the panel test signal terminals may include a plurality of panel test signal terminals, and the panel test signal lines may include a plurality of panel test signal lines. The number of the panel test control signals and the number of the panel test signals are not limited herein.

The array test sub-circuit P2 may include a plurality of array test switch units and a plurality of multiple test terminals. The array test switch units are configured to connect to the panel test sub-circuit P1 and the data lines. The array test switch units may specifically be switch devices, such as TFTs, etc., which is not limited herein. The array test sub-circuit P2 may be configured to control the array test switch units to turn on or turn off according to the plurality of received array test control signals, to output short circuit determination signals through the test terminals according to the plurality of panel test signals transmitted by the panel test sub-circuit P1. The short-circuit determination signals are used to determine whether there is a short-circuited data line in the display panel.

The array test control signals may be generated by array test control signal terminals and transmitted through array test control signal lines. Due to the large number and dense arrangement of data lines, in product design, it is not possible to correspond each data line to one test terminal. The array test sub-circuit P2 in the demux mode is thus introduced. The array test sub-circuit P2 in the embodiment of the present application is an array test sub-circuit P2 adopting the demux mode. A test terminal in the array test sub-circuit P2 may correspond to two or more data lines. For example, the array test sub-circuit P2 in the test circuit shown in FIG. 2 shows test terminals Pad1, Pad2, and Pad3. The test terminals may not be limited to Pad1, Pad2, and Pad3, and may include more test terminals, which are not shown in FIG. 2 one by one. Each of the test terminals corresponds to four data lines. For another example, the array test sub-circuit P2 in the test circuit shown in FIG. 3 shows test terminals Pad1, Pad2, and Pad3. The test terminals may not be limited to Pad1, Pad2, and Pad3, and may include more test terminals, which are not shown in FIG. 3 one by one. Each of the test terminals corresponds to two data lines.

In a test sub-period, at least one set of the array test switch units are turned on. Under a condition that the at least one set of the array test switches are turned on, the panel test signals corresponding to different types of sub-pixels in the display panel change alternately to an effective level.

An array test control signal may control a set of array test switch units to turn on or turn off. A plurality of array test control signals may control a plurality of sets of array test switch units to turn on or turn off. If an array test control signal is at the effective level, a set of array test switch units controlled by the array test control signal are turned on. If an array test control signal is at a failure level, a set of array test switch units controlled by the array test control signal are turned off.

The display panel may include a plurality of types of sub-pixels, and each type of sub-pixels may correspond to one panel test signal, that is, one panel test signal is used to detect the type of sub-pixel. For example, the sub-pixels may include three types of sub-pixels: red sub-pixels, green sub-pixels and blue sub-pixels. The red sub-pixels correspond to a panel test signal, the green sub-pixels correspond to another panel test signal, and the blue sub-pixels correspond to yet another panel test signal.

Under a condition that at least one set of the array test switches are turned on, the panel test signals corresponding to different types of sub-pixels in the display panel change alternately to the effective level. At most one of the different panel test signals is at the effective level at the same moment.

If none of the data lines in the display panel is short-circuited, the panel test signals may be transmitted to the test terminals for output, through the turned-on panel test switch units and the turned-on array test switch units, and are outputted by the test terminals as the short circuit determination signals. If there is a short-circuited data line in the display panel, the panel test signals may be affected by the short-circuited data line during the process of passing the turned-on panel test switch units and the turned-on array test switch units, and the short circuit determination signals transmitted to and outputted by the test terminals may be different from the short circuit determination signals. Therefore, it may be determined whether there is a short-circuited data line in the display panel according to the short circuit determination signals.

In the embodiment of the present application, the panel test signals are transmitted to the test terminals in the array test sub-circuit P2, by controlling the panel test switch units in the panel test sub-circuit P1 to turn on or turn off, and controlling the array test switch units in the array test sub-circuit P2 to turn on or turn off, through the plurality of panel test control signals, the plurality of panel test signals, and the plurality of array test control signals. Under a condition that at least one set of array test switches are turned on, the plurality of panel test signals change alternately to the effective level, to perform a short circuit test on each data line. A test on whether there is a short-circuited data line in the display panel can be implemented according only to the short-circuit determination signals outputted by the test terminals, so that relevant measures can be taken in time to avoid a yield loss of the display panel.

Particularly, in the above embodiments, control terminals of the panel test switch units are configured to connect to the panel test control signal lines for transmitting the panel test control signals. One of a first terminal and a second terminal of a panel test switch unit is configured to connect to a panel test signal line for transmitting a panel test signal. The other one of the first terminal and the second terminal of the panel test switch unit is configured to connect to a data line Control terminals of the array test switch units is configured to connect to array test control signal lines for providing the array test control signals. One of a first terminal and a second terminal of a array test switch unit is configured to connect to a data line. The other one of the first terminal and the second terminal of the array test switch unit is configured to connect to a test terminal For ease of description, the test circuits shown in FIG. 2 and FIG. 3 are taken as examples below, to illustrate timing of the panel test control signals, panel test signals and array test control signals respectively. The sub-pixels include a plurality of first sub-pixels, a plurality of second sub-pixels, and a plurality of third sub-pixels. The plurality of first sub-pixels, the plurality of second sub-pixels, and the plurality of third sub-pixels may specifically be red sub-pixels, blue sub-pixels, and green sub-pixels, respectively. The sub-pixels shown in FIGS. 2 and 3 include a plurality of red sub-pixels R, a plurality of blue sub-pixels B, and a plurality of green sub-pixels G.

As shown in FIG. 2, there are three panel test control signal lines, namely D_SW1, D_SW2 and D_SW3. There are three panel test signal lines, namely D_R, D_B and D_G. There are four array test control signal lines, namely AT_D1, AT_D2, AT_D3 and AT_D4. The panel test switch units includes specifically TFT K1 to K20. The array test switch units includes TFT T1 to T12.

Here, a signal line and a signal generated by the signal line are denoted by the same reference number. For example, a panel test control signal generated by the panel test control signal line D_SW1 is also denoted by D_SW1.

In some embodiments, in a test sub-period, a set of array test switch units are turned on. In a test period, a plurality of sets of array test switch units are turned on successively. One test period includes two or more test sub-periods. Under a condition that a set of array test switch units are turned on, a panel test signal corresponding to the plurality of first sub-pixels, a panel test signal corresponding to the plurality of second sub-pixels, and a panel test signal corresponding to the plurality of third sub-pixels change alternately to the effective level.

The effective level may be a high level, and correspondingly, the failure level may be a low level. Alternatively, the effective level may be a low level, and correspondingly, the failure level may be a low level. The effective level can be set according to specific work scenarios and work requirements, which is not limited here.

As shown in FIG. 2, control terminals of the panel test switch units K1, K4, K6, K9, K11, K14, K16 and K19 are connected to the panel test control signal line D_SW1. Control terminals of the panel test switch units K2, K5, K7, K10, K12, K15, K17 and K20 are connected to the panel test control signal line D_SW2. Control terminals of the panel test switch units K3, K8, K13 and K18 are connected to the panel test control signal line D_SW3.

Figure 4:
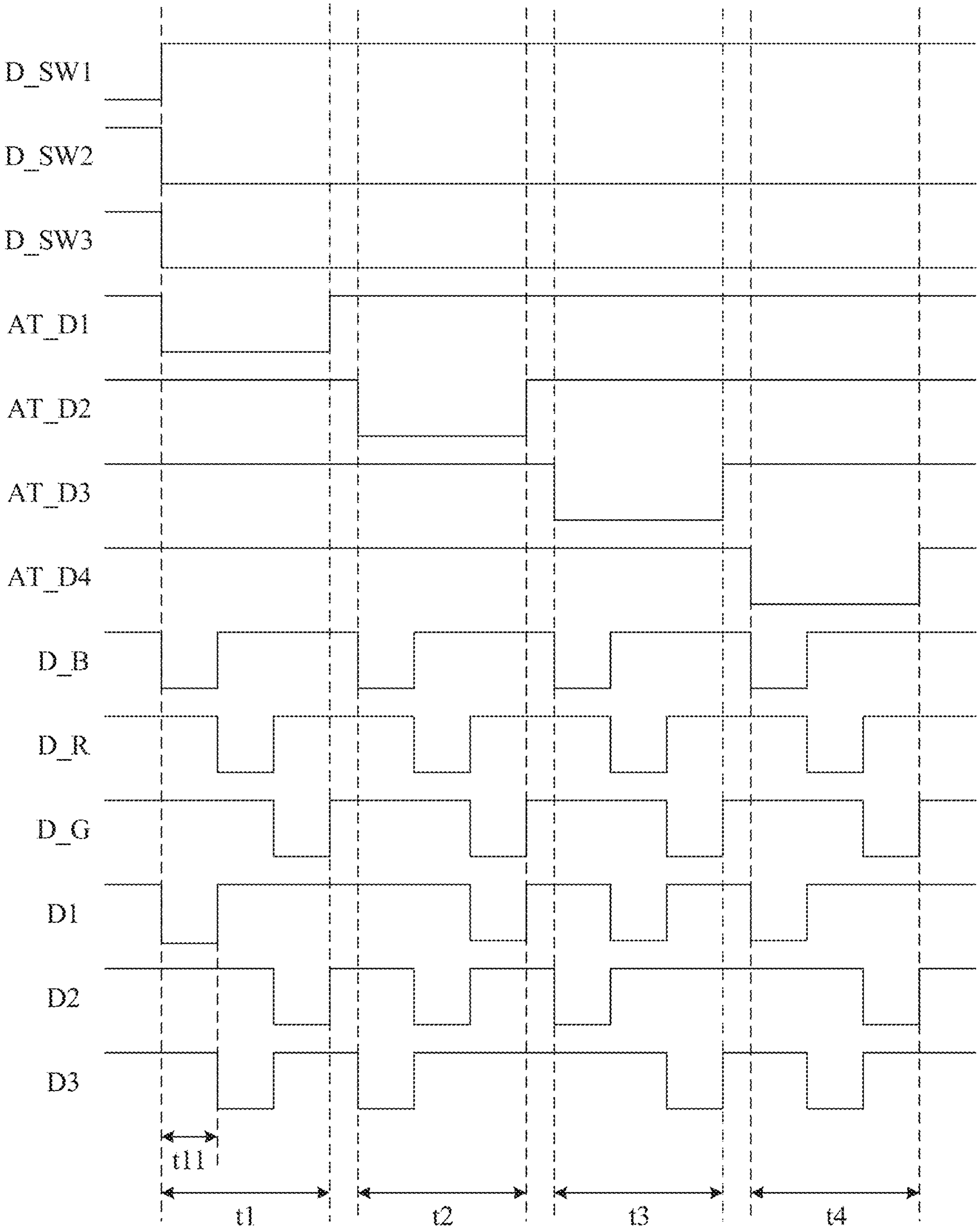
FIG. 4 is a signal timing diagram corresponding to the test circuit for the display panel shown in FIG. 2 provided by an embodiment of the present application.

FIG. 4 is a signal timing diagram corresponding to the test circuit for the display panel shown in FIG. 2 provided by an embodiment of the present application. As shown in FIG. 4, a test period includes four test sub-periods, and the four test sub-periods are t1, t2, t3, and t4, respectively. An effective level of the panel test control signals is high, an effective level of the panel test signals is low, and an effective level of the array test control signals is low.

In the test period, the panel test control signal D_SW1 maintains at the failure level, and the panel test control signals D_SW2 and D_SW3 maintain at the effective level. Correspondingly, in this test period, the panel test switch units K1, K4, K6, K9, K11, K14, K16 and K19 are turned off, and the panel test switch units K2, K3, K5, K7, K8, K10, K12, K13, K15, K17, K18 and K20 are turned on.

In the test sub-period t1, the array test control signal AT_D1 is at the effective level, and the array test control signals AT_D2, AT_D3, and AT_D4 are at the failure level. Correspondingly, the array test switch units T1, T5, and T9 are turned on, and the other array test switch units are turned off. The panel test signals D_R, D_B and D_G change alternately to the effective level.

In the test sub-period t2, the array test control signal AT_D2 is at the effective level, and the array test control signals AT_D1, AT_D3, and AT_D4 are at the failure level. Correspondingly, the array test switch units T2, T6, and T10 are turned on, and the other array test switch units are turned off. The panel test signals D_R, D_B and D_G change alternately to the effective level.

In the test sub-period t3, the array test control signal AT_D3 is at the effective level, and the array test control signals AT_D1, AT_D2, and AT_D4 are at the failure level. Correspondingly, the array test switch units T3, T7, and T11 are turned on, and the other array test switch units are turned off. The panel test signals D_R, D_B and D_G change alternately to the effective level.

In the test sub-period t4, the array test control signal AT_D4 is at the effective level, and the array test control signals AT_D1, AT_D2, and AT_D3 are at the failure level. Correspondingly, the array test switch units T4, T8, and T12 are turned on, and the other array test switch units are turned off. The panel test signals D_R, D_B and D_G change alternately to the effective level.

In some examples, the test circuit may further include a signal analysis module (not shown in the drawings of the specification), and the signal analysis module may be connected to each test terminal. The signal analysis module may be configured to determine that there is the short-circuited data line, under a condition that an amplitude of a short circuit determination signal exceeds a present signal standard amplitude range. The present signal standard amplitude range may be determined according to the present test control signals, panel test signals and array test control signals.

For example, if none of the data lines of the display panel is short-circuited, the short-circuit determination signals D1, D2, and D3 outputted by the test terminals Pad1, Pad2, and Pad3 should be as shown in FIG. 4. A normal fluctuation range of amplitudes of the short-circuit determination signals D1, D2, and D3 shown in FIG. 4 may be taken as the present signal standard amplitude range. The normal fluctuation range may be set according to work scenarios and work requirements, which is not limited here. If there is the short-circuited data line in the display panel, at the time when the amplitudes of the corresponding short-circuit determination signals D1, D2 or D3 should be within the normal fluctuation range of the effective level of the panel test signal, the amplitudes of the outputted short-circuit determination signals D1, D2 or D3 may exceed the present signal standard amplitude range, since the short-circuit determination signals D1, D2 or D3 may be affected by the failure level of an adjacent data line through which a signal at the failure level is transmitted due to the short-circuited data line. If the short-circuit determination signals in FIG. 4 are voltage signals, the effective level of the panel test signals is −5V. If a voltage of the short-circuit determination signal D1 corresponding to a time period t11 in FIG. 4 rises to 0V, it may be determined that there is the short-circuited data line in the display panel.

In other examples, the signal analysis module in the test circuit for the display panel may be configured to determine that there is the short-circuited data line, under a condition that a sum of the amplitudes of the short-circuit determination signals outputted from three adjacent test terminals exceeds a first preset signal standard amplitude range. The first preset signal standard amplitude range may be determined according to the effective level of the panel test signals. The first preset signal standard amplitude range may specifically be the normal fluctuation range of the effective level of the panel test signals.

For example, if none of the data lines of the display panel is short-circuited, the short-circuit determination signals D1, D2, and D3 outputted by the test terminals Pad1, Pad2, and Pad3 should be as shown in FIG. 4. The sum of the amplitudes of the short-circuit determination signals D1, D2, and D3 at each moment is within the normal fluctuation range of the panel test signal. If the short-circuit determination signals in FIG. 4 are voltage signals, the effective level of the panel test signals is −5V. Under a condition that none of the data lines of the display panel is short-circuited, the sum of the short-circuit determination signals D1, D2, and D3 outputted by the test terminals Pad1, Pad2, and Pad3 should be within a normal fluctuation range of −5V. If the sum of the short-circuit determination signals D1, D2, and D3 outputted by the test terminals Pad1, Pad2, and Pad3 exceeds the normal fluctuation range of −5V, it may be determined that there is the short-circuited data line in the display panel.

In other embodiments, in a test sub-period, at least two sets of array test switch units are turned on successively. Under a condition that a set of array test switch units are turned on, a panel test signal corresponding to the plurality of first sub-pixels, a panel test signal corresponding to the plurality of second sub-pixels, or a panel test signal corresponding to the plurality of third sub-pixels change to the effective level. Further, in a test period, the panel test signal corresponding to the plurality of first sub-pixels, the panel test signal corresponding to the plurality of second sub-pixels, and the panel test signal corresponding to the plurality of third sub-pixels change alternately to the effective level.

Figure 5:
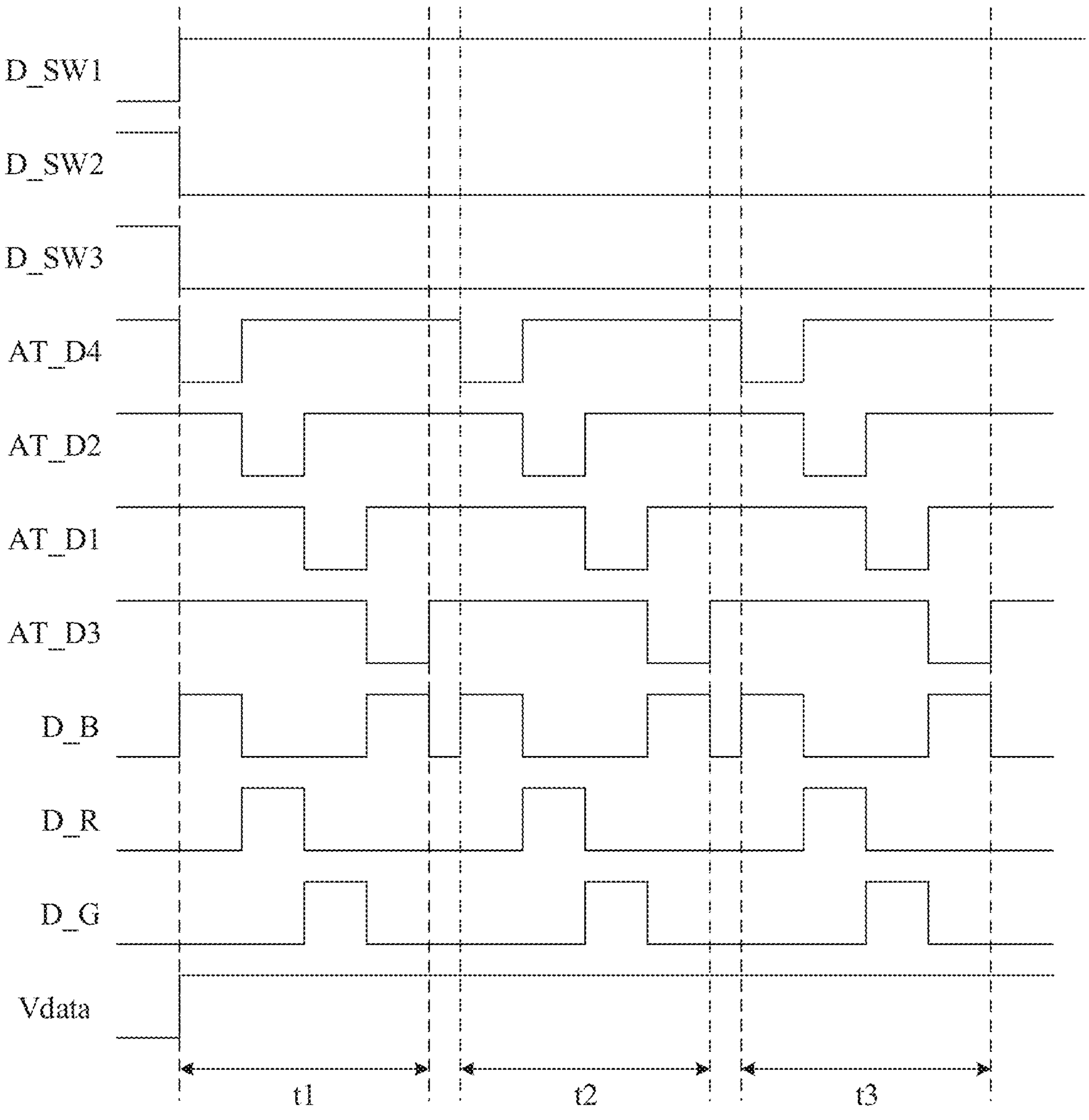
FIG. 5 is another signal timing diagram corresponding to the test circuit for the display panel shown in FIG. 2 provided by an embodiment of the present application.

FIG. 5 is another signal timing diagram corresponding to the test circuit for the display panel shown in FIG. 2 provided by an embodiment of the present application. As shown in FIG. 5, a test period includes three test sub-periods, and the three test sub-periods are t1, t2, and t3, respectively. An effective level of the panel test control signals is high, an effective level of the panel test signals is high, and an effective level of the array test control signals is low. The short-circuit determination signals may be current signals or voltage signals, which is not limited here.

In a test period, the panel test control signal D_SW1 maintains at the failure level, and the panel test control signals D_SW2 and D_SW3 maintain at the effective level. Correspondingly, in this test period, the panel test switch units K1, K4, K6, K9, K11, K14, K16, and K19 are turned off, and the panel test switch units K2, K3, K5, K7, K8, K10, K12, K13, K15, K17, K18, and K20 are turned on.

In each test sub-period, the array test control signals AT_D1, AT_D2, AT_D3, and AT_D4 change alternately to the effective level successively. At the same time, at most one of the array test control signals AT_D1, AT_D2, AT_D3, and AT_D4 can change to the effective level. When each array test control signal changes to the effective level, the corresponding panel test signal changes to the effective level. At most one of the panel test signals D_R, D_B, and D_G can change to the effective level at the same moment.

In each test sub-period, the array test control signal AT_D1 changes to the effective level, and correspondingly, the panel test signal D_R changes to the effective level. The array test control signal AT_D2 changes to the effective level, and correspondingly, the panel test signal D_G changes to the effective level. The array test control signal AT_D3 changes to the effective level, and correspondingly, the panel test signal D_B changes to the effective level. The array test control signal AT_D4 changes to the effective level, and correspondingly, the panel test signal D_R changes to the effective level.

Each of the test terminals receives a data line signal, and an amplitude of the data line signal is constant. The data line signal in FIG. 5 is Vdata. Under a condition that none of the data lines in the display panel is short-circuited, since the difference between the effective level of respective panel test signals D_R , D_B and D_G and the amplitude of the data line signal Vdata is a constant value, respective short circuit determination signals outputted by respective test terminals are all within a second preset signal standard amplitude range. The second preset signal standard amplitude range can be determined according to the effective level of the panel test signals and the amplitude of the data line signal.

The signal analysis module in the test circuit for the display panel may be used to determine a data line corresponding to a generated target short circuit determination signal as the short-circuited data line. The target short circuit determination signal is one of the short circuit determination signals whose amplitude exceeds the second preset signal standard amplitude range.

In other words, if there is a short-circuit determination signal whose amplitude exceeds the second preset signal standard amplitude range, the short-circuited data line can be traced according to the short-circuit determination signal and a structure of the test circuit, so that the short-circuited data line can be located accurately to facilitate the follow-up of relevant measures.

For example, Table 1 shows test data of the panel test control signals, the panel test signals, the array test control signals, and the short circuit determination signals. The effective level of the panel test control signals is high, the effective level of the panel test signals is high, and the effective level of the array test control signals is low. The short-circuit determination signals in Table 1 are current signals. In the table, "high" refers to a high level, and "low" refers to a low level. 1 to 12 refer to the first data line to the twelfth data line, 13 to 24 refer to the thirteenth data line to the twenty-fourth data line, and so on. A row of data corresponding to 1 to 12 are current values of the short circuit determination signals outputted by the test terminals, and so on.

TABLE 1

| | | | | | | | | | | | | |
|---|---|---|---|---|---|---|---|---|---|---|---|---|
| D_R | high | Low | Low | high | Low | Low | high | Low | Low | high | Low | Low |
| D_G | Low | high | Low | Low | high | Low | Low | high | Low | Low | high | Low |
| D_B | Low | Low | high | Low | Low | high | Low | Low | high | Low | Low | high |

TABLE 1-continued

| | | | | | | | | | | | | |
|---|---|---|---|---|---|---|---|---|---|---|---|---|
| D_SW1 | high | high | high | high | high | high | high | high | high | high | high | high |
| D_SW2 | Low | Low | Low | Low | Low | Low | Low | Low | Low | Low | Low | Low |
| D_SW3 | Low | Low | Low | Low | Low | Low | Low | Low | Low | Low | Low | Low |
| AT_D1 | Low | high | high | high | Low | high | high | high | Low | high | high | high |
| AT_D2 | high | Low | high | high | high | Low | high | high | high | Low | high | high |
| AT_D3 | high | high | Low | high | high | high | Low | high | high | high | Low | high |
| AT_D4 | high | high | high | Low | high | high | high | Low | high | high | high | Low |
| 1 to 12 | 0.038 | 0.036 | 0.037 | 0.036 | 0.032 | 0.035 | 0.036 | 0.034 | 0.035 | 0.104 | 0.034 | 0.035 |
| 13 to 24 | 0.036 | 0.035 | 0.037 | 0.036 | 0.143 | 0.035 | 0.036 | 0.033 | 0.036 | 0.037 | 0.035 | 0.038 |
| . . . | . . . | . . . | . . . | . . . | . . . | . . . | . . . | . . . | . . . | . . . | . . . | . . . |
| 241 to 252 | 0.038 | 0.036 | 0.037 | 0.036 | 0.033 | 0.034 | 0.035 | 0.034 | 0.034 | 0.035 | 0.033 | 0.034 |
| . . . | . . . | . . . | . . . | . . . | . . . | . . . | . . . | . . . | . . . | . . . | . . . | . . . |

As can be seen from Table 1, the second preset signal standard amplitude range is [0.032, 0.038]. In Table 1, a current value of the short-circuit determination signal corresponding to the tenth data line exceeds the second preset signal standard amplitude range, and a current value of the short-circuit determination signal corresponding to the seventeenth data line exceeds the second preset signal standard amplitude range. It can be determined that the tenth data line and the seventeenth data lines are short-circuited.

As shown in FIG. 3, there are three panel test control signal lines, namely D_SW1, D_SW2 and D_SW3. There are three panel test signal lines, namely D_R, D_B and D_G. There are two array test control signal lines, namely AT_D1 and AT_D2. The panel test switch units include specifically K1 to K10. The array test switch units include T1 to T6.

Here, a signal line and a signal generated by the signal line are denoted by the same reference number. For example, a panel test control signal generated by the panel test control signal line D_SW1 is also denoted by D_SW1.

As shown in FIG. 2, the control terminals of the panel test switch units K1, K4, K6 and K9 are connected to the panel test control signal line D_SW1. The control terminals of the panel test switch units K2, K5, K7 and K10 are connected to the panel test control signal line D_SW2. The control terminals of the panel test switch units K3 and K8 are connected to the panel test control signal line D_SW3.

Figure 6:
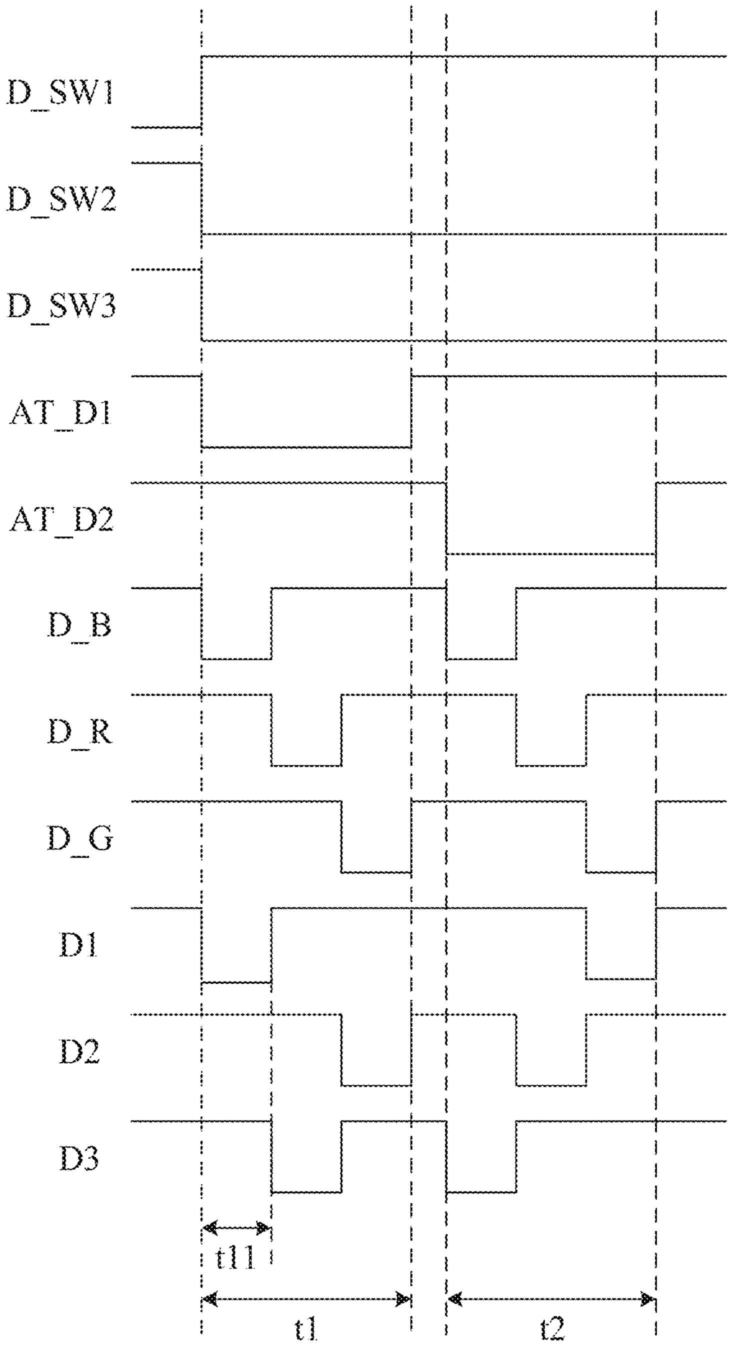
FIG. 6 is a signal timing diagram corresponding to the test circuit for the display panel shown in FIG. 3 provided by an embodiment of the present application.

FIG. 6 is a signal timing diagram corresponding to the test circuit for the display panel shown in FIG. 3 provided by an embodiment of the present application. As shown in FIG. 6, a test period includes two test sub-periods, and the two test sub-periods are t1 and t2 respectively. An effective level of the panel test control signal is high, an effective level of the panel test signals is low, and an effective level of the array test control signals is low.

In a test period, the panel test control signal D_SW1 maintains at the failure level, and the panel test control signals D_SW2 and D_SW3 maintain at the effective level. Correspondingly, in this test period, the panel test switch units K1, K4, K6, and K9 are turned off, and the panel test switch units K2, K3, K5, K7, K8, and K10 are turned on.

In the test sub-period t1, the array test control signal AT_D1 is at the effective level, and the array test control signal AT_D2 is at the failure level. Correspondingly, the array test switch units T1, T3, and T5 are turned on, and the other array test switch units are turned off. The panel test signals D_R, D_B and D_G change alternately to the effective level.

In the test sub-period t2, the array test control signal AT_D2 is at the effective level, and the array test control signal AT_D1 is at the failure level. Correspondingly, the array test switch units T2, T4, and T6 are turned on, and the other array test switch units are turned off. The panel test signals D_R, D_B and D_G change alternately to the effective level.

In some examples, the test circuit may further include a signal analysis module (not shown in the drawings of the specification), and the signal analysis module may be connected to each test terminal. The signal analysis module can be configured to determine that there is the short-circuited data line, under a condition that an amplitude of a short circuit determination signal exceeds a present signal standard amplitude range. The present signal standard amplitude range may be determined according to the present panel test control signals, panel test signals and array test control signals.

For example, if none of the data lines of the display panel is short-circuited, the short-circuit determination signals D1, D2, and D3 outputted by the test terminals Pad1, Pad2, and Pad3 should be as shown in FIG. 6. A normal fluctuation range of amplitudes of the short-circuit determination signals D1, D2, and D3 shown in FIG. 6 may be taken as the present signal standard amplitude range. The normal fluctuation range may be set according to work scenarios and work requirements, which is not limited here. If there is the short-circuited data line in the display panel, at the time when the amplitudes of the corresponding short-circuit determination signals D1, D2 or D3 should be within the normal fluctuation range of the effective level of the panel test signal, the amplitudes of the outputted short-circuit determination signals D1, D2 or D3 may exceed the present signal standard amplitude range, since the short-circuit determination signals D1, D2 or D3 may be affected by the failure level of an adjacent data line through which a signal at the failure level is transmitted due to the short-circuited data line. If the short-circuit determination signals in FIG. 6 are voltage signals, the effective level of the panel test signals is −5V. If a voltage of the short-circuit determination signal D1 corresponding to a time period t11 in FIG. 6 rises to 0V, it may be determined that there is the short-circuited data line in the display panel.

In other examples, the signal analysis module in the test circuit for the display panel may be configured to determine that there is the short-circuited data line, under a condition that a sum of the amplitudes of the short-circuit determination signals outputted from three adjacent test terminals exceeds a first preset signal standard amplitude range. The first preset signal standard amplitude range may be determined according to the effective level of the panel test signals. The first preset signal standard amplitude range may specifically be the normal fluctuation range of the effective level of the panel test signals.

For example, if none of the data lines of the display panel is short-circuited, the short-circuit determination signals D1, D2, and D3 outputted by the test terminals Pad1, Pad2, and Pad3 should be as shown in FIG. 6. The sum of the amplitudes of the short-circuit determination signals D1, D2, and D3 at each moment is within the normal fluctuation range of the panel test signal. If the short-circuit determination signals in FIG. 6 are voltage signals, the effective level of the panel test signals is −5V. Under a condition that none of the data lines of the display panel is short-circuited, the sum of the short-circuit determination signals D1, D2, and D3 outputted by the test terminals Pad1, Pad2, and Pad3 should be within a normal fluctuation range of −5V. If the sum of the short-circuit determination signals D1, D2, and D3 outputted by the test terminals Pad1, Pad2, and Pad3 exceeds the normal fluctuation range of −5V, it may be determined that there is the short-circuited data line in the display panel.

Figure 7:
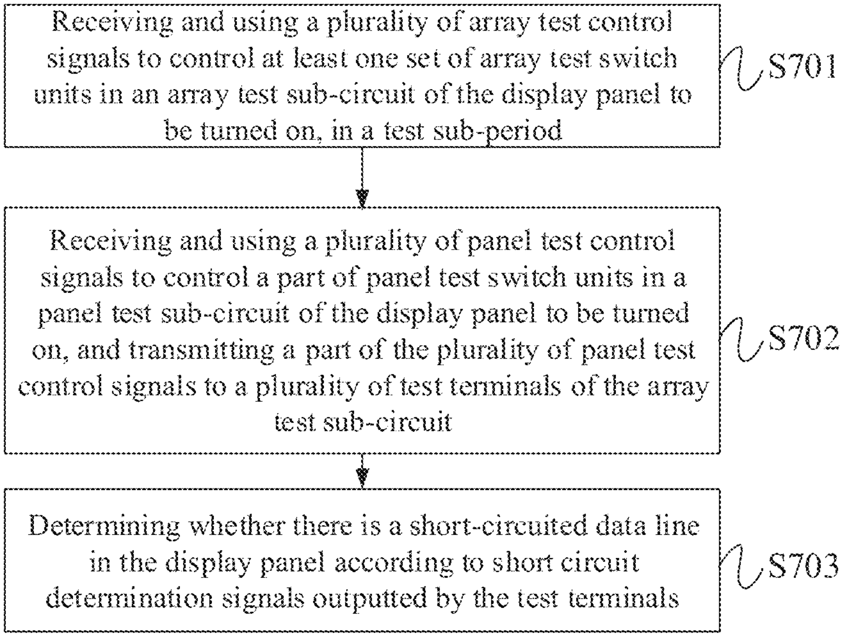
FIG. 7 is a flowchart of a test method fora display panel provided by an embodiment of the present application.

An embodiment of the present application provides a test method for the display panel, which may be applied to the test circuit for the display panel in the foregoing embodiment. FIG. 7 is a flowchart of a test method fora display panel provided by an embodiment of the present application. As shown in FIG. 7, the test method may include steps S701 to S703.

In step S701, in a test sub-period, a plurality of array test control signals are received and used to control at least one set of array test switch units in an array test sub-circuit of the display panel to be turned on.

In step S702, a plurality of panel test control signals are received and used to control a part of panel test switch units in a panel test sub-circuit of the display panel to be turned on, and a part of the plurality of panel test control signals are transmitted to a plurality of test terminals of the array test sub-circuit.

In step S703, it is determined whether there is a short-circuited data line in the display panel according to short circuit determination signals outputted by the test terminals In the embodiment of the present application, the panel test signals are transmitted to the test terminals in the array test sub-circuit, by controlling the panel test switch units in the panel test sub-circuit to turn on or turn off, and controlling the array test switch units in the array test sub-circuit to turn on or turn off, through the plurality of panel test control signals, the plurality of panel test signals, and the plurality of array test control signals. Under a condition that at least one set of array test switches are turned on, the plurality of panel test signals change alternately to the effective level, to perform a short circuit test on each data line. A test on whether there is a short-circuited data line in the display panel can be implemented according only to the short-circuit determination signals outputted by the test terminals, so that relevant measures can be taken in time to avoid a yield loss of the display panel.

In some examples, the above step S703 may be implemented specifically by determining that there is the short-circuited data line, under a condition that an amplitude of a short circuit determination signal exceeds a present signal standard amplitude range. The present signal standard amplitude range is determined according to the present panel test control signals, panel test signals and array test control signals.

In some other examples, the above step S703 may be implemented specifically by determining that there is the short-circuited data line, under a condition that a sum of amplitudes of short-circuit judgment signals output by three adjacent test terminals exceeds a first preset signal standard amplitude range. The first preset signal standard amplitude range is determined according to the effective level of the panel test signals In some examples, each of the test terminals in the test circuit receives a data line signal, and an amplitude of the data line signal is constant. A data line corresponding to a generated target short circuit determination signal is determined as the short-circuited data line, so that the short-circuited data line can be located accurately. The target short circuit determination signal is one of the short circuit determination signals whose amplitude exceeds a second preset signal standard amplitude range.

An embodiment of the present application further provides a display panel, which includes the test circuit for the display panel in the foregoing embodiment. Particularly, the test circuit can be arranged in a non-display area of the display panel. The above-mentioned display panel may be a display screen of a mobile phone, a tablet, a palmtop computer, an IPAD, etc., which is not limited herein.

It should be noted that various embodiments in this specification are described in a progressive manner. The same or similar parts among the various embodiments can be referred to each other. Each embodiment focuses on differences from other embodiments. The description of the test circuit embodiment may be referred to for related parts of the test method embodiment and the display panel embodiment.

Those skilled in the art should understand that the above-mentioned embodiments are all illustrative and not restrictive. Different technical features appearing in different embodiments can be combined to achieve beneficial effects.

What is claimed is:

1. A test circuit for a display panel, comprising:

a panel test sub-circuit, comprising a plurality of panel test switch units configured to connect to a plurality of data lines of the display panel, the panel test sub-circuit being configured to control, according to a plurality of received panel test control signals, the panel test switch units to turn on or turn off, to transmit a plurality of panel test signals; and an array test sub-circuit, comprising a plurality of array test switch units and a plurality of test terminals, the array test switch units being configured to connect to the panel test sub-circuit and the data lines, the array test sub-circuit being configured to control, according to a plurality of received array test control signals, the array test switch units to turn on or turn off, to output short circuit determination signals through the test terminals according to the plurality of panel test signals transmitted by the panel test sub-circuit, the short circuit determination signals being used to determine whether there is a short-circuited data line in the display panel, wherein: at least one set of the array test switch units are turn on in a test sub-period, and under a condition that the at least one set of the array test switch units are turn on, the panel test signals corresponding to different types of sub-pixels in the display panel change alternately to an effective level:

the sub-pixels comprise a plurality of first sub-pixels, a plurality of second sub-pixels and a plurality of third sub-pixels;

a set of the array test switch units are turn on in the test sub-period;

a plurality of sets of the array test switch units are turn on successively in a test period and the test period comprises two or more test sub-periods; and under a condition that the set of the array test switch units are turned on, a panel test signal corresponding to the first sub-pixels, a panel test signal corresponding to the second sub-pixels, and a panel test signal corresponding to the third sub-pixels change alternately to the effective level.

2. The test circuit of claim 1, wherein for each of the panel test switch units, a control terminal of the panel test switch unit is configured to connect to a panel test control signal line for transmitting a panel test control signal, a first terminal of the panel test switch unit is configured to connect to a panel test signal line for transmitting the panel test signals, and a second terminal of the panel test switch unit is configured to connect to a data line.

3. The test circuit of claim 1, wherein for each of the array test switch units, a control terminal of the array test switch unit is configured to connect to an array test control signal line for providing an array test control signal, a first terminal of the array test switch unit is configured to connect to a data line, and a second terminal of the array test switch unit is configured to connect to a test terminal.

4. The test circuit of claim 1, wherein each of the test terminals corresponds to two or more of the data lines.

5. The test circuit of claim 1, further comprising a signal analysis module, configured to determine that there is the short-circuited data line, under a condition that an amplitude of a short circuit determination signal exceeds a present signal standard amplitude range, the present signal standard amplitude range being determined according to the present panel test control signals, panel test signals and array test control signals.

6. The test circuit of claim 1, further comprising a signal analysis module, configured to determine that there is the short-circuited data line, under a condition that a sum of amplitudes of short-circuit determination signals output from three adjacent test terminals exceeds a first preset signal standard amplitude range, the first preset signal standard amplitude range being determined according to the effective level of the panel test signals.

7. The test circuit of claim 1, wherein at least two sets of the array test switch units are turned on successively in the test sub-period.

8. The test circuit of claim 7, wherein the test terminals receive a data line signal, and an amplitude of the data line signal is constant, the test circuit further comprises a signal analysis module, configured to determine a data line corresponding to a generated target short circuit determination signal as the short-circuited data line, the target short circuit determination signal being one of the short circuit determination signals whose amplitude exceeds a second preset signal standard amplitude range.

9. A test method for a display panel, comprising:

receiving and using a plurality of array test control signals to control at least one set of array test switch units in an array test sub-circuit of the display panel to be turned on, in a test sub-period;

receiving and using a plurality of panel test control signals to control a part of panel test switch units in a panel test sub-circuit of the display panel to be turned on, and transmitting a part of the plurality of panel test control signals to a plurality of test terminals of the array test sub-circuit;

turning on a set of the array test swtich units in the test sub-period;

turning on successively a plurality of sets of the array test switch units in a test period, wherein the test period comprises two or more test sub-periods; and under a condition that the set of the array test switch units are turned on, changing alternately a panel test signal corresponding to a plurality of first sub-pixels of the sub-pixels, a panel test signal corresponding to a plurality of second sub-pixels of the sub-pixels, and a panel test signal corresponding to a plurality of third sub-pixels of the sub-pixels to the effective level; and determining whether there is a short-circuited data line in the display panel according to short circuit determination signals outputted by the test terminals.

10. The test method of claim 9, wherein the determining whether there is a short-circuited data line according to short circuit determination signals outputted by the test terminals comprises:

determining that there is the short-circuited data line, under a condition that an amplitude of a short circuit determination signal exceeds a present signal standard amplitude range, wherein the present signal standard amplitude range is determined according to the present panel test control signals, the panel test signals and the array test control signals.

11. The test method of claim 9, wherein the determining whether there is a short-circuited data line according to the short circuit determination signals outputted by the test terminals comprises:

determining that there is the short-circuited data line, under a condition that a sum of amplitudes of short-circuit determination signals outputted from three adjacent test terminals exceeds a first preset signal standard amplitude range, wherein the first preset signal standard amplitude range is determined according to the effective level of the panel test signals.

12. The test method of claim 9, further comprising:

turning on successively at least two sets of the array test switch units in the test sub-period.

13. The test method of claim 12, wherein the test terminals receive a data line signal, and an amplitude of the data line signal is constant, the test method further comprises:

determining a data line corresponding to a generated target short circuit determination signal as the short-circuited data line, the target short circuit determination signal being one of the short circuit determination signals, amplitude of the short circuit determination signals exceeds a second preset signal standard amplitude range.

14. A display panel, comprising the test circuit for the display panel of claim 1.

15. The display panel of claim 14, wherein for each of the panel test switch units, a control terminal of the panel test switch unit is configured to connect to a panel test control signal line for transmitting a panel test control signal, a first terminal of the panel test switch unit is configured to connect to a panel test signal line for transmitting a panel test signal, and a second terminal of the panel test switch unit is configured to connect to a data line.

16. The display panel of claim 14, wherein for each of the array test switch units, a control terminal of the array test switch unit is configured to connect to an array test control signal line for providing an array test control signal, a first terminal of the array test switch unit is configured to connect to a data line, and a second terminal of the array test switch unit is configured to connect to a test terminal.

17. The display panel of claim 14, wherein each of the test terminals corresponds to two or more of the data lines.

* * * * *